Feb. 5, 1929.

R. HAMILTON 1,701,107

DRAWBAR

Filed July 21, 1926

INVENTOR
RUSH HAMILTON

ATTORNEY

Patented Feb. 5, 1929.

1,701,107

UNITED STATES PATENT OFFICE.

RUSH HAMILTON, OF PIEDMONT, CALIFORNIA, ASSIGNOR TO STANDARD GAS ENGINE CO., OF OAKLAND, CALIFORNIA.

DRAWBAR.

Application filed July 21, 1926. Serial No. 123,916.

My invention relates to improvements in draw-bars, and it consists in the combinations, constructions, and arrangements hereinafter described and claimed.

An object of my invention is to provide a draw-bar which aids in turning the tractor, thus permitting the tractor to make a shorter turn, and facilitates handling of the implements.

Other objects and advantages will appear in the following specification, and the novel features of the invention will be particularly pointed out in the appended claims.

Figure 1:
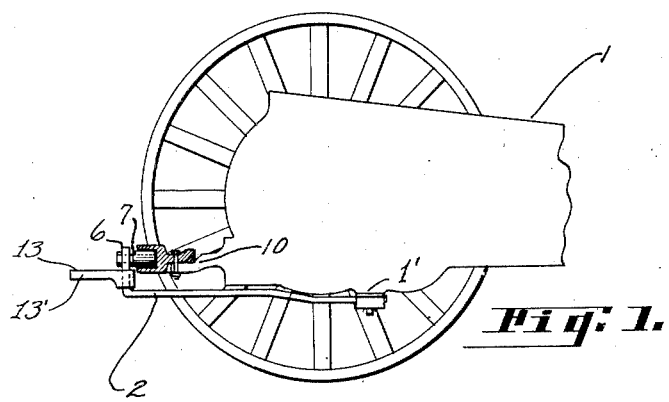
Figure 2:
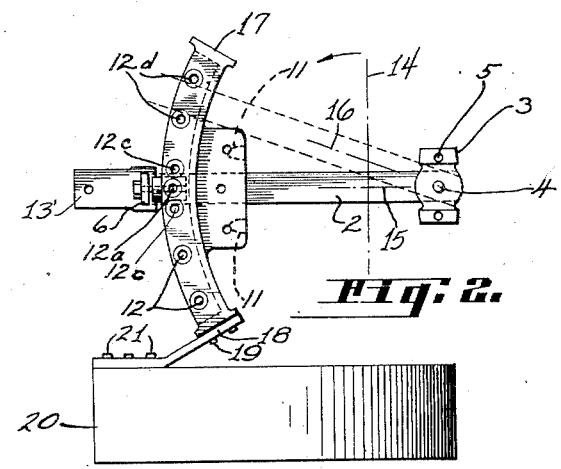
Figure 3:
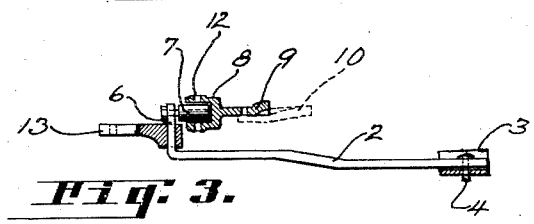

My invention is illustrated in the accompanying drawing, forming a part of this application in which Figure 1 is a view showing the device operatively applied to a tractor, Figure 2 is a plan view of the device, and Figure 3 is a sectional view of the device.

In carrying out my invention I make use of a tractor 1 which has a boss 1' disposed on the transmission casing to which I pivotally secure a draw-bar 2. It will be noted in Figure 1 that the pivotal point of the drawbar 2 is disposed 5½ inches in front of the center line through the rear axle. This construction aids in turning the tractor which will be hereinafter described.

A bracket 3 is pivotally connected to the draw-bar 2 by means of a rivet 4 and in turn is connected to the tractor 1 by means of bolts (not shown) which are passed through openings 5. The head of the rivet is disposed between the draw-bar and the boss 1', thus preventing the rivet from working loose.

The free end of the draw-bar 2 is turned upwardly at 6 and carries a roller 7 for a purpose now to be described.

The roller 7 is received in an arcuate-shaped channel 8. The channel 8 has a web portion 9 which is bolted to a projection 10 integral with the tractor 1. The projection 10 is in the form of a loop and the sides of this loop have re-enforcing ridges which are indentations 11 in the web-portion 9.

The draw-bar 2 is adapted to be held in various positions if desired. Figures 2 and 3 show how the top and bottom wall of the channel 8 is provided with a plurality of openings 12. A bolt (not shown) is adapted to be inserted into the center opening of the channel 8 and this limits the movement of the draw-bar between the center and one end of the channel. When bolts 12ᵃ are inserted in openings 12ᶜ they will lock the draw-bar in a central position. When the bolts are inserted in the openings 12ᵈ, they will lock the draw-bar 2 in the dotted line position shown in Figure 2.

From the foregoing description of the various parts of device, the operation thereof may be readily understood. The upwardly bent portion 6 provides a strong support for a connecting link 13. The tongue or clevis of the implement (not shown) may be removably secured to link 13. The link has a non-circular opening which receives the portion 6 which prevents the swinging of the link on the portion. This construction permits the tractor to back up an implement without the link swinging.

The link 13 also has a reduced portion 13' which may be reversed from the position shown in Figure 1 for changing the line of draft.

At times when it is desirable to hold the rear end of the draw-bar in a fixed position, which action is advisable in pulling certain implements or appliances such as two-wheeled trailers, the draw-bar is swung to the desired position and bolts are placed in the openings 12 on each side of the draw-bar.

In Figure 2, I have drawn a line 14 representing the longitudinal axis of the rear shaft of the tractor, and lines 15 and 16 which represent center lines through the draw-bar in the two positions shown. When the drawbar is in the dotted line position it will create a pull upon the tractor tending to swing the rear axle 14 in the direction of the arrow, thus aiding in causing the tractor to make a short turn.

The channel 8 has closed ends 17 to which brackets 18 are secured by bolts 19. The brackets 18 are secured to fenders 20 by bolts 21.

I claim:

1. A device of the type described comprising a draw-bar having one end pivotally secured to a tractor, a guide channel secured to said tractor, the other end of said draw-bar being bent upwardly and being disposed outside of said channel, a roller carried by the free end of said bent draw-bar portion and being slidably received in said channel for supporting the free end of said draw-bar, adjustable means for securing said roller in said channel for preventing relative movement of said draw-bar with respect to said channel and a connecting link slidably secured to said upwardly bent draw-bar portion to vary the line of draw-bar pull.

2. A device of the type described comprising a draw-bar having one end pivotally secured to a tractor, a guide channel secured to said tractor, a roller carried by the free end of said draw-bar and being slidably received in said channel for supporting the free end of said draw-bar, adjustable means for securing said draw-bar in said channel for preventing relative movement of said draw-bar with respect to said channel, said means comprising stops, said channels having openings therein for receiving said stops, and a connecting link slidably secured to said upwardly extending portion to vary the line of draw-bar pull.

3. A draw-bar adapted to be pivotally secured to a tractor, a guide channel secured to said tractor, the free end of said draw-bar having an upwardly extending portion, a roller carried by the upper end of said extension and being receivable in said channel, means for securing said draw-bar to said channel, and a connecting link slidably secured to said upwardly extending portion to vary the line of draw-bar pull.

4. The combination with a tractor, a draw-bar pivotally secured to said tractor, the pivot point being disposed in front of the rear axle of said tractor, said draw-bar projecting rearwardly of said pivot point and below said rear axle, said draw-bar having an upwardly extending portion, a roller carried by said portion, a channel carried by said tractor, said roller being slidably received in said channel, and means for securing said draw-bar to said channel in adjusted position.

5. A device of the type described comprising a draw-bar having one end pivotally secured to a tractor, a guide channel secured to said tractor, the other end of said draw-bar being bent upwardly and being disposed outside of said channel, a roller carried by the free end of said bent draw-bar portion and being slidably received in said channel for supporting the free end of said draw-bar, adjustable means for securing said roller in said channel for preventing relative movement of said draw-bar with respect to said channel, a connecting link slidably secured to said upwardly bent draw-bar portion to vary the line of draw-bar pull, and fenders secured to the opposite side of said channel.

6. A draw-bar adapted to be pivotally secured to a tractor, a guide channel secured to said tractor, the free end of said draw-bar having an upwardly extending portion, a roller carried by the upper end of said extension and being receivable in said channel, means for securing said draw-bar to said channel, a connecting link slidably secured to said upwardly extending portion to vary the line of draw-bar pull, and fenders secured to the opposite side of said channel.

In testimony whereof I affix my signature.

RUSH HAMILTON.